United States Patent
Jayaraman et al.

(10) Patent No.: US 11,868,635 B2
(45) Date of Patent: Jan. 9, 2024

(54) STORAGE SYSTEM WITH PRIVACY-CENTRIC MULTI-PARTITIONS AND METHOD FOR USE THEREWITH

(71) Applicant: Western Digital Technologies, Inc., San Jose, CA (US)

(72) Inventors: Muralitharan Jayaraman, Bangalore (IN); Mayur Jain, Karnataka (IN); Balakumar Rajendran, Bangalore (IN); Narendhiran Cr, Bangalore (IN); Garvita Chauhan, Bangalore (IN); Prashantha Krishna, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 192 days.

(21) Appl. No.: 16/853,275

(22) Filed: Apr. 20, 2020

(65) Prior Publication Data

US 2021/0326054 A1 Oct. 21, 2021

(51) Int. Cl.
| | |
|---|---|
| *G06F 3/06* | (2006.01) |
| *G06F 21/78* | (2013.01) |
| *G06F 21/36* | (2013.01) |
| *G06F 21/43* | (2013.01) |
| *G06F 21/32* | (2013.01) |

(52) U.S. Cl.
CPC ............ *G06F 3/0644* (2013.01); *G06F 3/064* (2013.01); *G06F 3/0614* (2013.01); *G06F 3/0653* (2013.01); *G06F 3/0659* (2013.01); *G06F 3/0673* (2013.01); *G06F 21/32* (2013.01); *G06F 21/36* (2013.01); *G06F 21/43* (2013.01); *G06F 21/78* (2013.01)

(58) Field of Classification Search
CPC ...... G06F 3/0644; G06F 3/0614; G06F 3/064; G06F 3/0653; G06F 3/0659; G06F 3/0673; G06F 21/32; G06F 21/36; G06F 21/43; G06F 21/78
See application file for complete search history.

(56) References Cited

U.S. PATENT DOCUMENTS

| | | | |
|---|---|---|---|
| 6,442,067 B1 * | 8/2002 | Chawla | G06F 9/4401 365/185.11 |
| 7,181,053 B2 | 2/2007 | Wang et al. | |
| 9,235,698 B2 | 1/2016 | Webber et al. | |
| 10,735,030 B2 * | 8/2020 | Lesartre | H03M 13/152 |
| 2003/0133420 A1 * | 7/2003 | Haddad | H04W 28/08 370/319 |
| 2006/0242150 A1 | 10/2006 | Jogand-Coulomb et al. | |

(Continued)

*Primary Examiner* — Kaushikkumar M Patel
(74) *Attorney, Agent, or Firm* — Crowell & Moring LLP

(57) ABSTRACT

A storage system with privacy-centric multi-partitions and method for use therewith are provided. In one embodiment, a storage system comprises a memory configured to be partitioned into a plurality of partitions, wherein each partition is associated with its own boot block, and wherein each boot block is configured to boot any of the plurality of partitions. The storage system also comprises a controller configured to communicate with the memory and to: in response to a failure to boot one of the plurality of partitions with that partition's boot block, use a boot block of another one of the plurality of partitions to boot the one of the plurality of partitions; and restrict access to each of the plurality of partitions only to authenticated entities. Other embodiments are provided.

20 Claims, 8 Drawing Sheets

(56) References Cited

U.S. PATENT DOCUMENTS

| | | | |
|---|---|---|---|
| 2007/0288740 A1* | 12/2007 | Dale | G06F 9/4405 |
| | | | 713/2 |
| 2008/0005527 A1* | 1/2008 | Bang | G06F 9/441 |
| | | | 711/202 |
| 2011/0258425 A1* | 10/2011 | Galbo | G06F 3/062 |
| | | | 711/E12.008 |
| 2017/0153843 A1 | 6/2017 | Dewitt et al. | |
| 2017/0359171 A1* | 12/2017 | Haridas | H04L 9/0891 |
| 2018/0173536 A1* | 6/2018 | Sela | G06F 9/441 |
| 2018/0188974 A1* | 7/2018 | Cayton | G06F 3/0611 |
| 2019/0339888 A1 | 11/2019 | Sasidharan et al. | |
| 2020/0097188 A1* | 3/2020 | Gunda | G06F 12/1009 |

\* cited by examiner

STORAGE SYSTEM WITH PRIVACY-CENTRIC MULTI-PARTITIONS AND METHOD FOR USE THEREWITH

BACKGROUND

Some storage systems are embedded in a host computing device (e.g., a mobile device, a desktop computer, a laptop computer, a netbook), and the memory in the storage system can be partitioned into multiple partitions, all controlled by a single control block for booting all of the partitions. To provide security, the host computing device can protect data stored in a partition using encryption and/or using a content protection scheme, such as requiring a login via a user account, requiring the presence of a smartcard, and using biometric authentication.

DETAILED DESCRIPTION

Overview

Figure 1A:
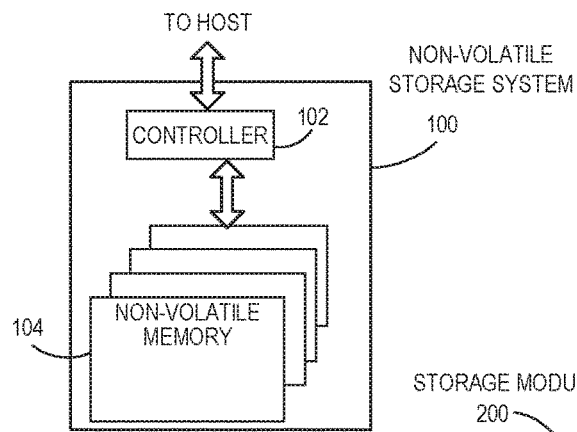
FIG. 1A is a block diagram of a non-volatile storage system of an embodiment.

By way of introduction, the below embodiments relate to a storage system with privacy-centric multi-partitions and method for use therewith. In one embodiment, a storage system is provided comprising a memory configured to be partitioned into a plurality of partitions, wherein each partition is associated with its own boot block, and wherein each boot block is configured to boot any of the plurality of partitions; and a controller. The controller is configured to communicate with the memory and to: in response to a failure to boot one of the plurality of partitions with that partition's boot block, use a boot block of another one of the plurality of partitions to boot the one of the plurality of partitions; and restrict access to each of the plurality of partitions only to authenticated entities.

In some embodiments, each partition's boot block is part of a control block that also stores a logical-to-physical address table for the partition, identification of an encoding/decoding technique used in the partition, authentication information for the partition, and/or identification of performance, reliability, and/or endurance characteristics for that partition.

In some embodiments, the controller is further configured to synchronize boot blocks among the plurality of partitions.

In some embodiments, the plurality of partitions comprises a plurality of namespaces.

In some embodiments, an entity authenticates to at least one of the plurality of partitions using two-factor authentication, biometric authentication, a Quick Response (QR) code, or a password.

In some embodiments, the storage system is configured to be embedded in a host.

In some embodiments, the storage system is configured to be removably connected to a host.

In some embodiments, the storage system is configured to wirelessly communicate with a plurality of hosts.

In some embodiments, the memory is further configured to be partitioned into an additional partition that is shared by a plurality of entities.

In some embodiments, the memory comprises a three-dimensional memory.

In another embodiment, a method is provided that is performed in a storage system comprising a first namespace and a second namespace, each namespace associated with a respective control block, and each control block configured to boot both the first and second namespaces. The method comprises: in response to a failure in booting the first namespace using the first namespace's control block, use the second namespace's control block to boot the first namespace; restrict access to the first namespace only to a user that authenticates to the first namespace; and restrict access to the second namespace only to a user that authenticates to the second namespace.

In some embodiments, the method further comprises synchronizing the control blocks.

In some embodiments, the method further comprises using at least one of the following to authenticate a user: two-factor authentication, biometric authentication, a Quick Response (QR) code, or a password.

In some embodiments, each control block stores at least one of the following: a logical-to-physical address table, identification of an encoding/decoding technique, authentication information, and/or identification of performance, reliability, and/or endurance characteristics.

In some embodiments, the memory comprises a third namespace that is shared by a plurality of users.

In some embodiments, the storage system wirelessly communicates with a plurality of hosts.

In another embodiment, a storage system is provided comprising: a memory configured to be partitioned into a plurality of partitions, wherein each partition is associated with its own control block, and wherein each control block is configured to boot any of the plurality of partitions; means for in response to a failure to boot one of the plurality of partitions with that partition's control block, using a control block of another one of the plurality of partitions to boot the one of the plurality of partitions; and means for restricting access to each of the plurality of partitions only to authenticated entities.

In some embodiments, each partition's control block also stores a logical-to-physical address table for the partition, identification of an encoding/decoding technique used in the partition, authentication information for the partition, and/or performance, reliability, and/or endurance characteristics for the partition.

In some embodiments, the storage system is configured to wirelessly communicate with a plurality of hosts.

In some embodiments, the storage system further comprises means for synchronizing boot blocks among the plurality of partitions.

Other embodiments are possible, and each of the embodiments can be used alone or together in combination. Accordingly, various embodiments will now be described with reference to the attached drawings.

EMBODIMENTS

Figure 1B:
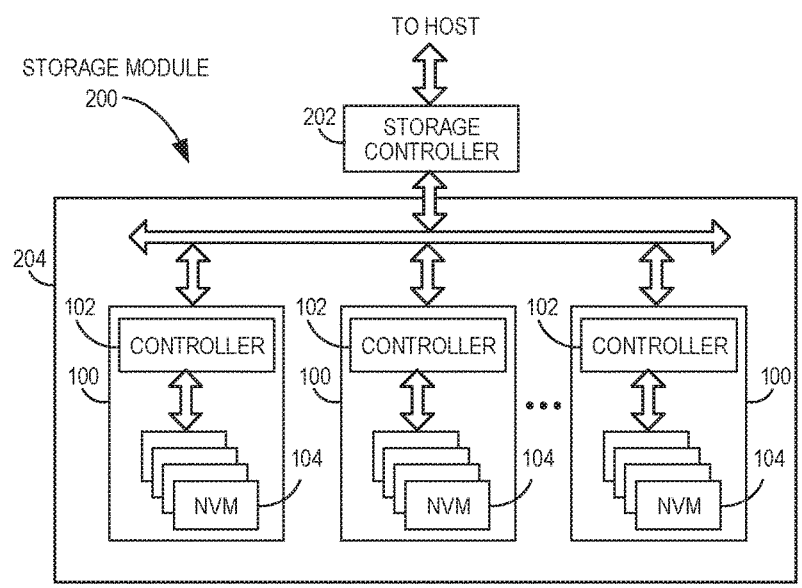
FIG. 1B is a block diagram illustrating a storage module of an embodiment.
Figure 1C:
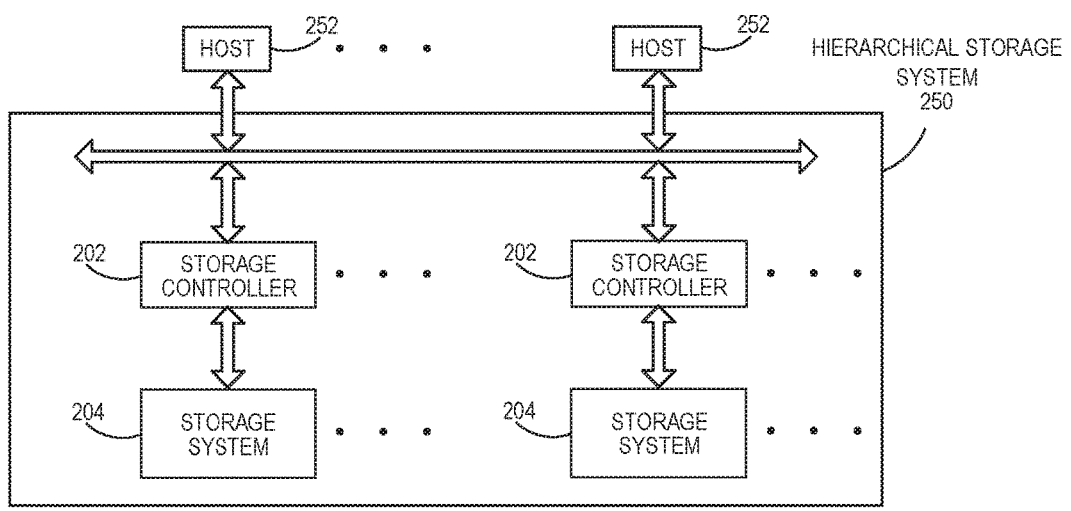
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
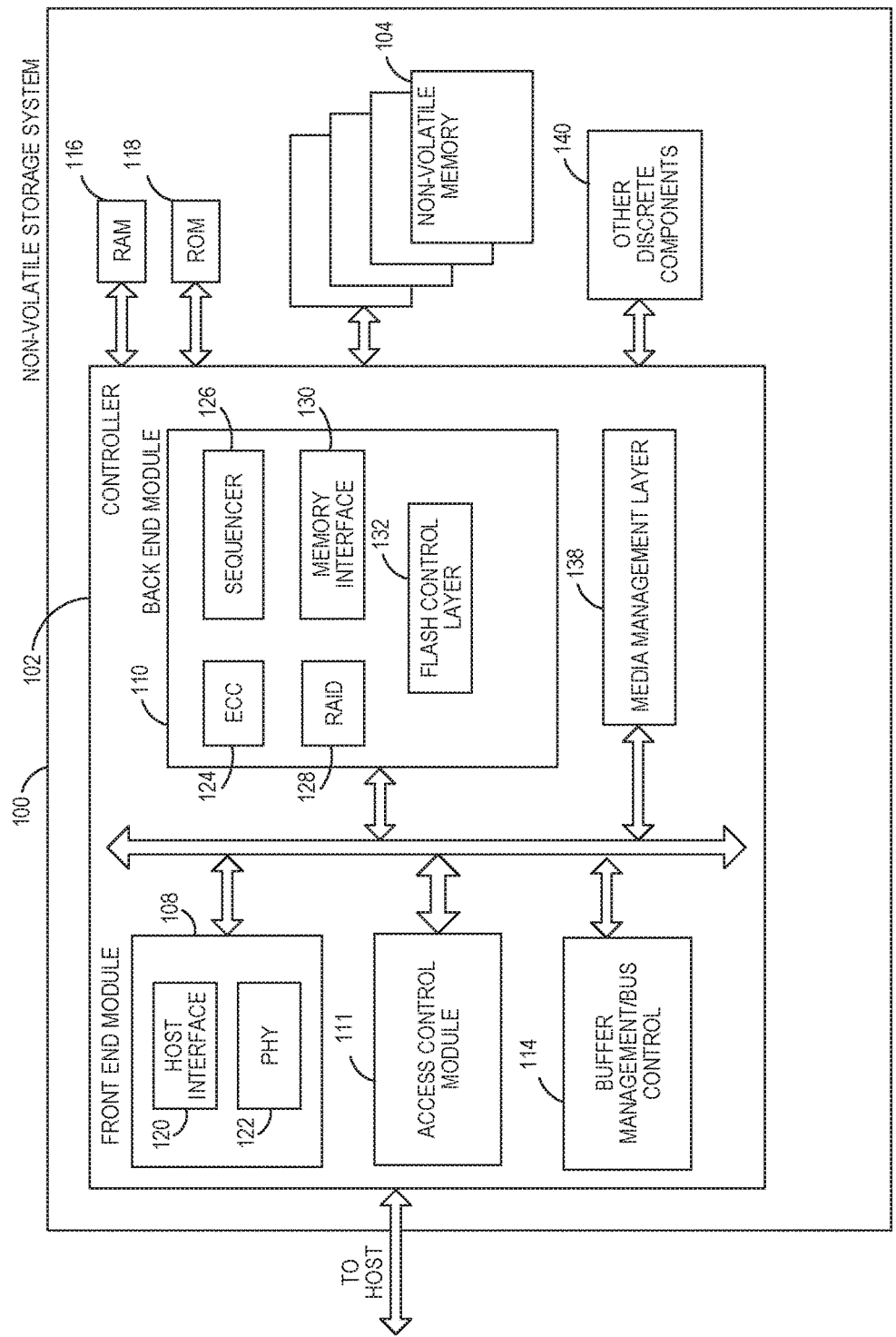
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include an access control module 111, which is discussed in more detail below, and can be implemented in hardware or software/firmware. The access control module 111 can be configured to perform the algorithms and methods discussed below and shown in the attached drawings to restrict access to different partitions/namespaces in memory.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
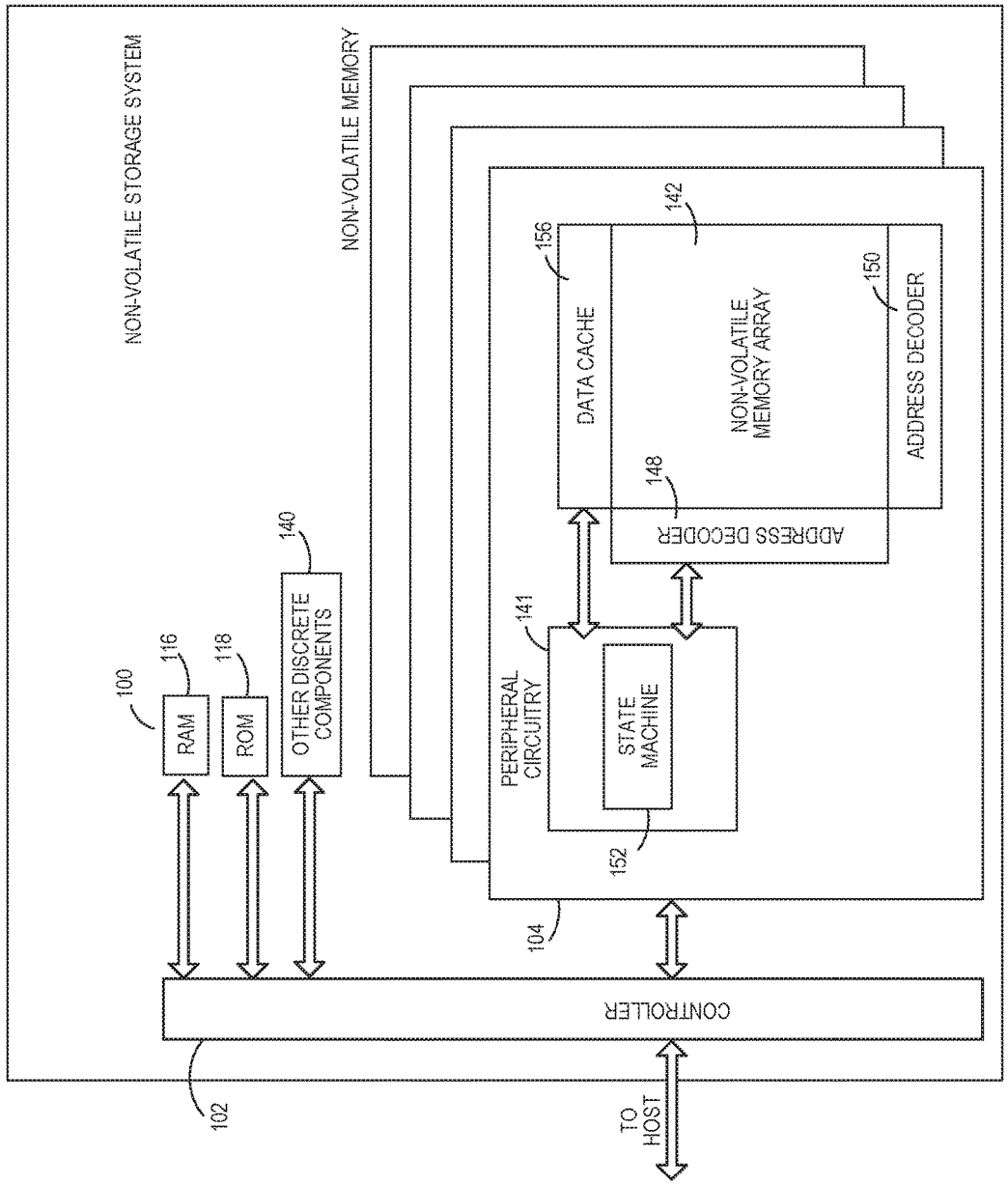
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Today, data storage is one of the important ingredients beneath much of the technology at the personal and enterprise data storage level. Traditional requirements of storage are performance, storage capacity, cost, and endurance. Advancement of technology can require data storage to be intelligent, secured, and personalized and to provide ease of data access locally as well as globally, using a small form factor.

As mentioned above, some storage systems are embedded in a host computing device (e.g., a mobile device, a desktop computer, a laptop computer, a netbook), and the memory in the storage system can be partitioned into multiple partitions, all controlled by a single control block for booting all of the partitions and providing authentication and other information that applies across all of the partitions. To provide security, the host computing device can protect data stored in a partition using encryption and/or using a content protection scheme, such as requiring a login via a user account, requiring the presence of a smartcard, and using biometric authentication.

However, the above solutions are not present in non-computing devices, such as non-embedded/removable storage devices (e.g., a slave, secondary flash storage medium). Further, the single control block for a physical device irrespective of the number of logical partitions can be problematic, even if that master control block is stored in primary/secondary pairs.

The following embodiments can be used to address these issues. These embodiments provide a personalized non-computing storage device with intelligent content protection. In one embodiment, a single physical flash storage device is presented that protects the integrity of its partitions against centralized control data corruptions at a low level and secures individual content of different entities/users in dedicated namespace/partition (in a multi-namespace/partition memory) on a single storage system using an authentication technique (e.g., finger print or other biometric authentication, two-level authentication, Quick Response (QR) codes, or any other access protection mechanism).

In one embodiment, the memory 104 of the storage system 100 is configured to be partitioned into a plurality of partitions. Some or all of the partitions can have different characteristics (e.g., different performance, reliability, and/or endurance characteristics). If the storage system 100 is running in a Non-Volatile Memory Express (NVMe) environment, the partitions can be different namespaces. So, while some of the below examples will be described in terms of partitions and others in terms of namespaces, it should be understood that the concepts presented in the various examples can be used in both partitions and namespaces.

In one embodiment, each partition is associated with its own boot block, and each boot block is configured to boot any of the plurality of partitions. In this way, in response to a failure to boot one of the plurality of partitions with that partition's boot block, the controller 102 can use a boot block of another one of the plurality of partitions to do the booting. The controller 102 can be further configured to synchronize boot blocks among the plurality of partitions. That way, if a change/update is made to one of the boot blocks, it is copied to all of the other boot blocks. Further, each partition's boot block can be part of a control block that also stores a logical-to-physical address table for the partition, identification of an encoding/decoding technique used in the partition, and/or authentication information for the partition.

The controller 102 in this embodiment is also configured to restrict access to each of the plurality of partitions only to authenticated entities (e.g., using two-factor authentication or biometric (e.g., fingerprint) authentication). One of the memory partitions can be shared by a plurality of entities, with or without authentication.

In one embodiment, the storage system 100 comprises a wireless communication interface configured to wirelessly communicate with a plurality of hosts, each host being authenticated to a different one of the plurality of partitions. This example is illustrated in FIG. 3A and provides a unique privacy-centric data access scheme on a single non-computing storage device with multiple namespaces using authentication.

Figure 3A:
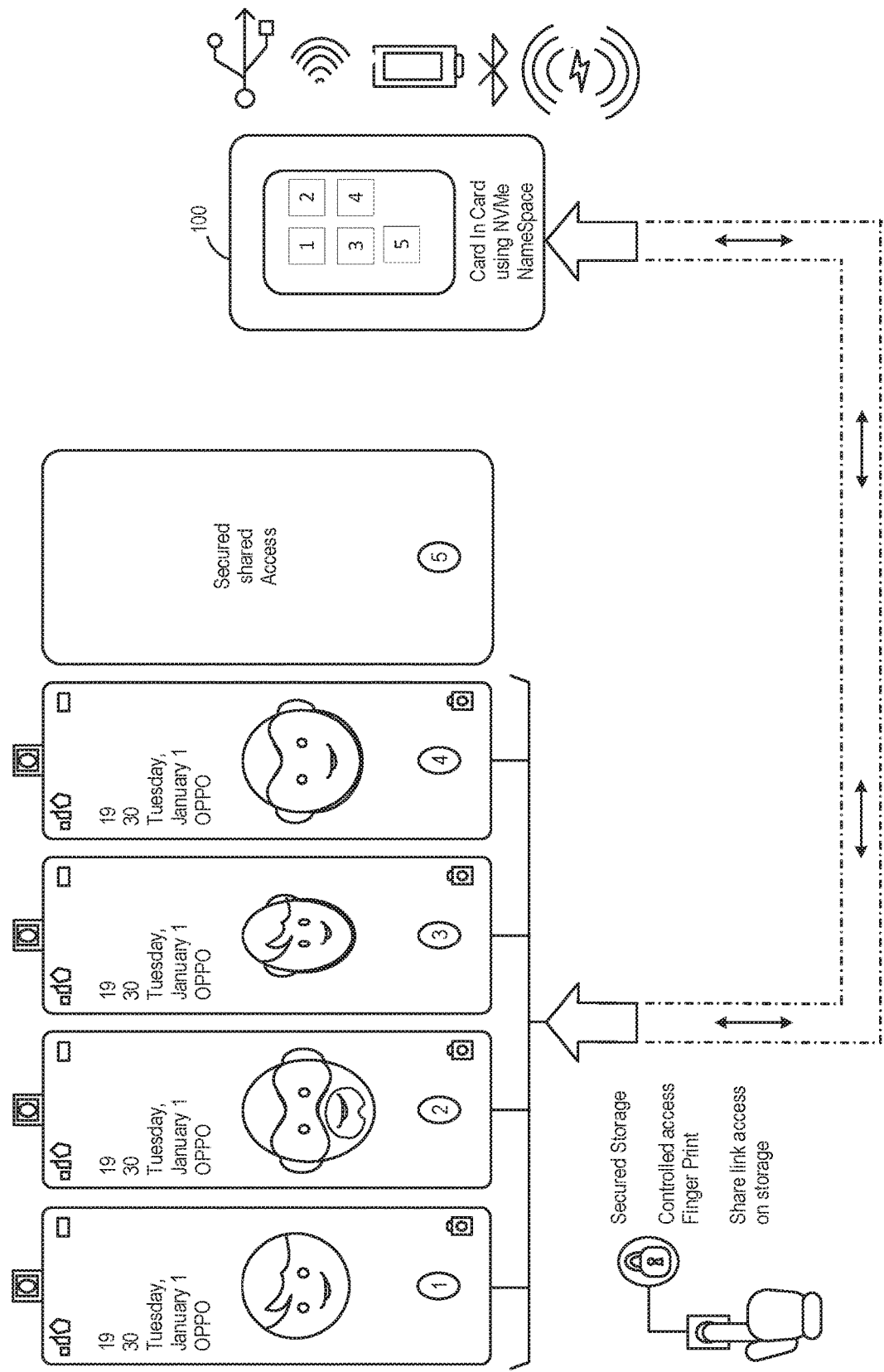
FIG. 3A is a block diagram of a plurality of hosts and a storage system of an embodiment.
Figure 3B:
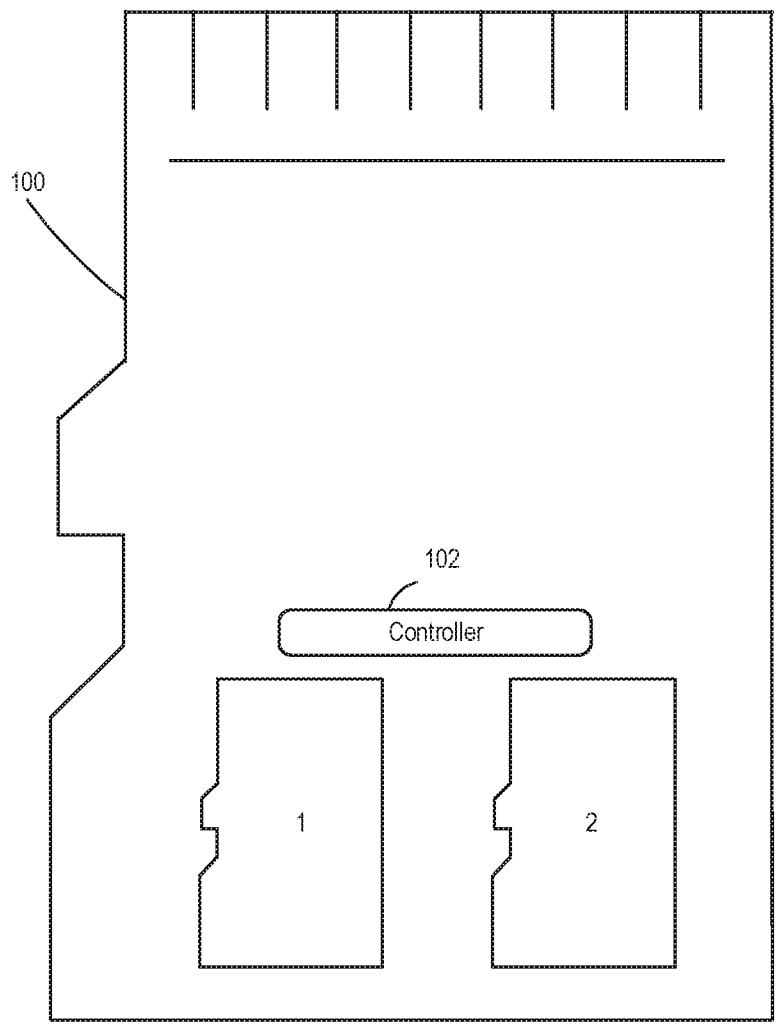
FIG. 3B is a block diagram of a card-in-card storage system of an embodiment.

As shown in FIG. 3A, the storage system 100 in this embodiment comprises a "card-in-card" system, in which a plurality of removable memory cards (e.g., micro SD Express Cards) are inserted into a portable, standalone storage device that provides wireless access to a plurality of hosts (mobile devices 1-5). FIG. 3B is an illustration of the "card-in-card" system 100 of an embodiment having two smaller memory cards 1, 2 inserted therein. As shown in FIG. 3B, the system 100 also comprises a controller 102 (e.g., a firmware component) for managing the two smaller cards.

In this embodiment, the overall memory provided by the removable memory cards has multiple namespaces (partitions) under the NVMe standard. Typical NVMe storage devices (e.g., SD Express devices) with multiple namespace are currently not secured at the namespace level for individual users. In contrast, the storage system 100 of one embodiment is configured for each individual user, in that each namespace is assigned to a single user, and no other user can access the data without authentication. Specifically, in one embodiment, the access control module 111 in the controller 102 is configured to restrict access to each namespace only to an authenticated entity.

The portable, standalone storage device, which can be battery powered and capable of wireless charging, can provide a small form factor, fast storage device for the plurality of hosts. It should be noted that while the plurality of hosts in this example are mobile devices (e.g., phones), different types of computing devices can be used as a host (e.g., a tablet, a laptop or other computer, etc.).

As mentioned above, the storage system 100 of this embodiment comprises a wireless communication interface configured to wirelessly communicate (e.g., over Wi-Fi, USB, Bluetooth, or the Internet) with the plurality of hosts. In this example, there are four users, each associated with one of the five namespaces in the storage system 100. The fifth namespace in the storage system 100 is a secured, shared access area that can be used by any of the four hosts. The four hosts can be used by any suitable users. For example, the four hosts can be different members of a family, friends, employees in a small business startup, etc. So, despite a single storage system (drive), the storage system 100 of this embodiment provides the user with an experience of a compact local cloud where the content can stay in isolation. Further, one user can share access to his partition with one or more other users. For example, after the user authenticates to his partition, he can share a link with another user that allows certain privileges (e.g., read only, read and write).

Figure 4:
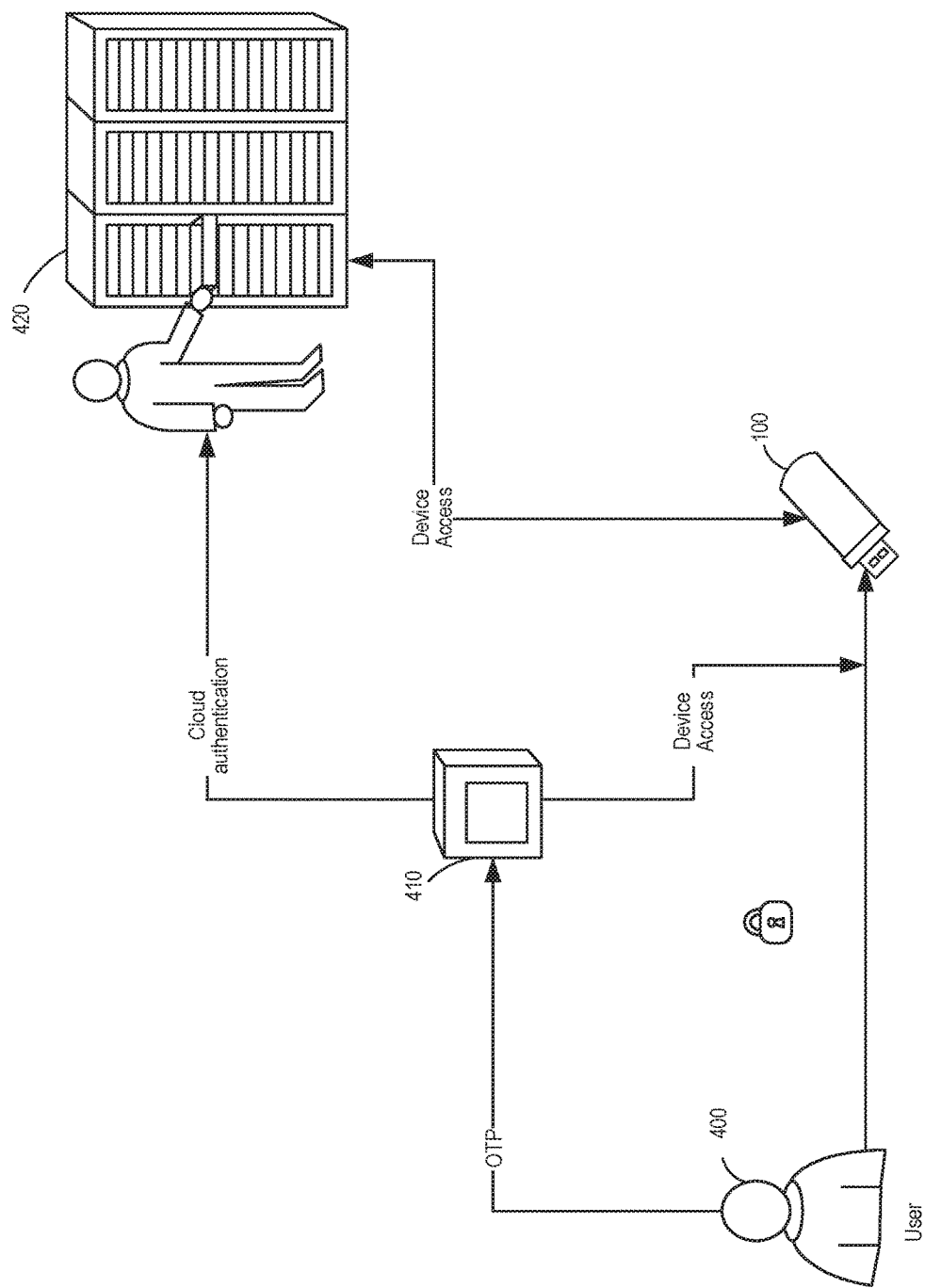
FIG. 4 is a block diagram illustrating a two-factor authentication technique of an embodiment.

The removable multi-partition storage system 100 in this embodiment features a robust security framework as compared to traditional encryption-based security offered in external solid-state drives. A user can authenticate to a namespace in any suitable way. For example, as shown FIG. 4, a user can use a cloud-based two-factor authentication technique. In operation, a user 400 provides a one-time password (OTP) to a computing device 410 (which can be the host the user is using to attempt to access the storage system 100), and the computing device 410 provides cloud authentication to a server 420. After authentication, the server 420 provides authentication permission to the storage system 100 to allow the user 400 to access the partition. Two-factor authentication provides the capability of device access across many host environments and allow the storage system 100 to verify the input OTP/cloud identifier on the fly before enabling access. This security framework results in content on a partition not being accessible unless the user 400 is authenticated. Additionally, in some embodiments, the storage system 100 can use a per-partition key-pair to make the data truly private.

Figure 5:
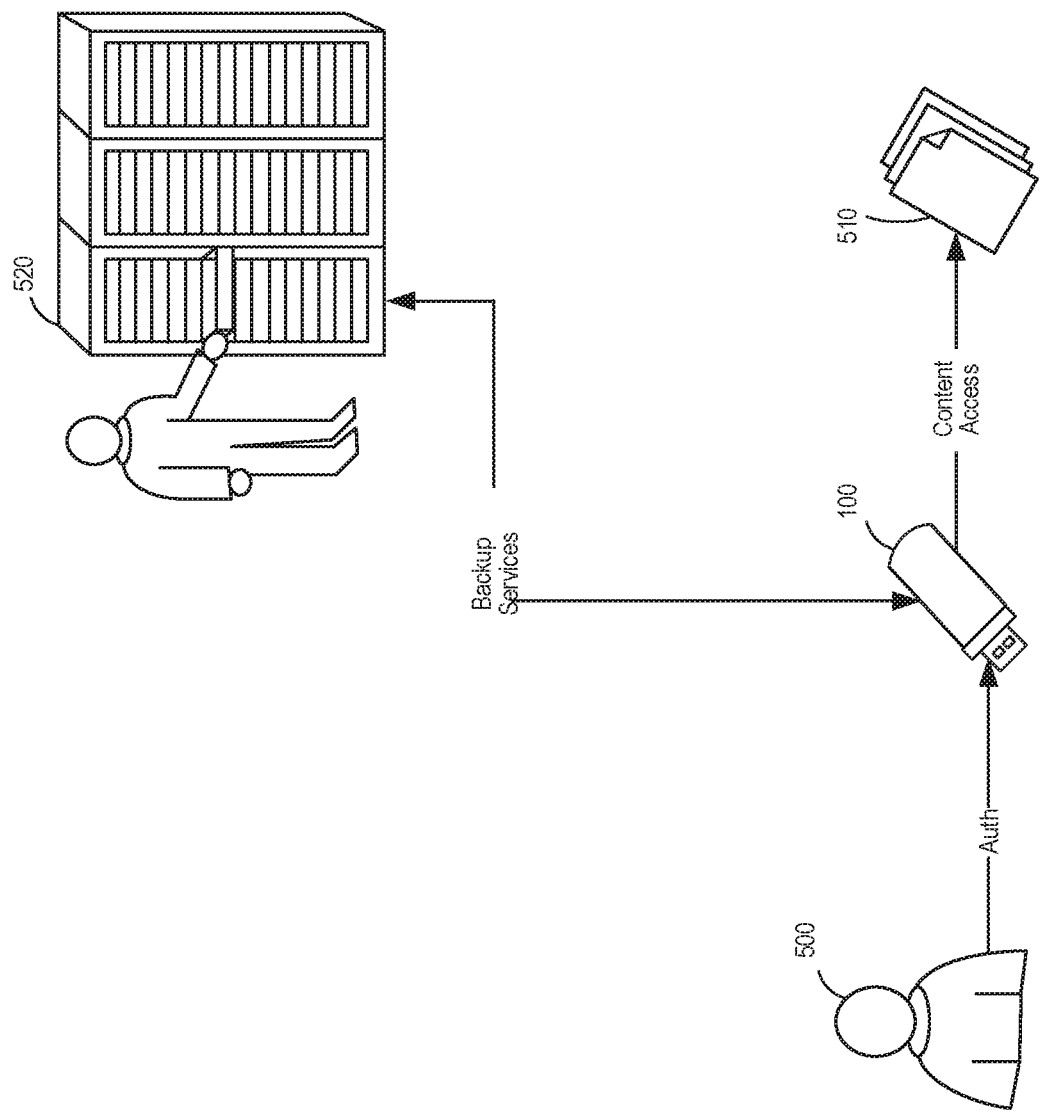
FIG. 5 is a block diagram illustrating a biometric authentication technique of an embodiment.

As another example (shown FIG. 5), a user can use a biometric (e.g., fingerprint) authentication technique. As shown in FIG. 5, a user 500 can provide his fingerprint or other biometric input to the storage system 100 itself to get access to content 510 stored in the authenticated partition. Biometric authentication can also be used to provide a backup service to a server 520. Using the storage system's in-built biometric sensor/reader allows authenticating to a partition without the need for an external application or other infrastructure to secure user content, as the authentication stays independent within the storage system 100. In one embodiment, a user's biometric data is securely stored within the storage system 100 to ensure privacy. In another embodiment, the storage system 100 is equipped with in-built battery support for on-the-fly authentication before using it in any host.

It should be noted that any other suitable authentication technique (e.g., QR codes, a password, etc.) can be used and that the storage system 100 can use one or many different authentication technique, either alone or in combination, among the various partitions.

As mentioned above, these embodiments can be used to provide partition integrity. Traditional storage devices with multiple logical partitions usually are protected by a single copy (primary/secondary pair) of a control block (sometimes referred to herein as control data) which has information about all the partitions. In case of adversity to these control blocks, all the mapping to the user data is lost, though the data is still intact in the physical space.

In one embodiment, each partition in the memory 104 has its own, dedicated control block. The creation of the control block can be either static or dynamic based on the configuration of the partitions. Each partition's control block can comprise a boot block for that partition (which can, for example, contain a pointer to a file system block and other data structures). That way, if there is a problem with one or more other partitions, the unaffected partition can still boot up using its own boot block. So, a problem with one control block will not affect the booting of the other partitions. Again, this is in contrast to prior systems with a single control block, as a problem with that single control block means all the partitions would be unable to boot up, and the device would be unusable. That is, in case of adversity to any of the partition's control blocks, other users connected to the system could still access their data in the other partitions. This provides a more integral approach toward securing data across different partitions in a single physical device. This partition integrity approach is similar to a RAID system for control information only, so that the users of the system are protected against each other's partition corrupting the entire system. With only protecting the control information, the impact on block budget and system performance is negligible. Different partitions of a storage system with their own set of control blocks provide the capability for the partitions to work in isolation without impacting other partitions' control information, as individual control blocks isolate user information and insulate partitions to other partitions' control block failures. With isolated boot blocks, a particular partition's control block failure will not impact the device's functioning capability.

In one embodiment, in addition to a control block for a partition containing its own boot block, a control block can contain the boot blocks of the other partitions. That way, if there is a problem with one partition's control block, it can access the redundant copy of the boot block from another one of the partitions. That is, the discrete boot copies can help in recovering other partitions through boot block synchronization logic. This provides enhanced data recovery and makes it less prone to failure at the hands of the user. In this embodiment, the controller 102 can be configured to synchronize the boot blocks. That way, if a partition's boot block is changed or updated, the new information is provided to the copies of the boot block in the other partitions' control blocks.

A control block can have other information in addition to a boot block. For example, a control block for a partition can have a logical-to-physical address table for that partition, identification of an encoding/decoding technique used in that partition, and/or authentication/security information for that partition (e.g., open or secured based on user preference and a specified access protection scheme).

A control block for a partition can also identify performance, reliability, and/or endurance characteristics for that partition. The dedicated control block in each partition enables the possibility to localize the properties of these partitions. For example, during the time of creation (or later), attributes to the partition can be set to high endurance (slow throughput, high data retention), high burst performance (a larger single level cell (SLC) pool at the cost of capacity and limited sustained performance), and high integrity (dual copy at the cost of performance and capacity). This enables a more robust and adaptable storage device within a single physical drive. The user is free from maintaining a clutter of different storage devices of the same form factor but with different attributes.

Different memory characteristics can be desired in the NVMe environment. For example, in the case of an NVMe endurance group, the memory 102 exposes its attributes to the host to manage the endurance group, which consists of NVM sets and namespaces. An endurance group is an abstract layer (not formed at physical card level or managed internally by firmware at lower level) memory attributes exposed to manage endurance logically using an upper layer/host. When memory attributes are exposed to the host, they can be exposed as multiple physical partitions managed by a firmware component layer.

Figure 6:
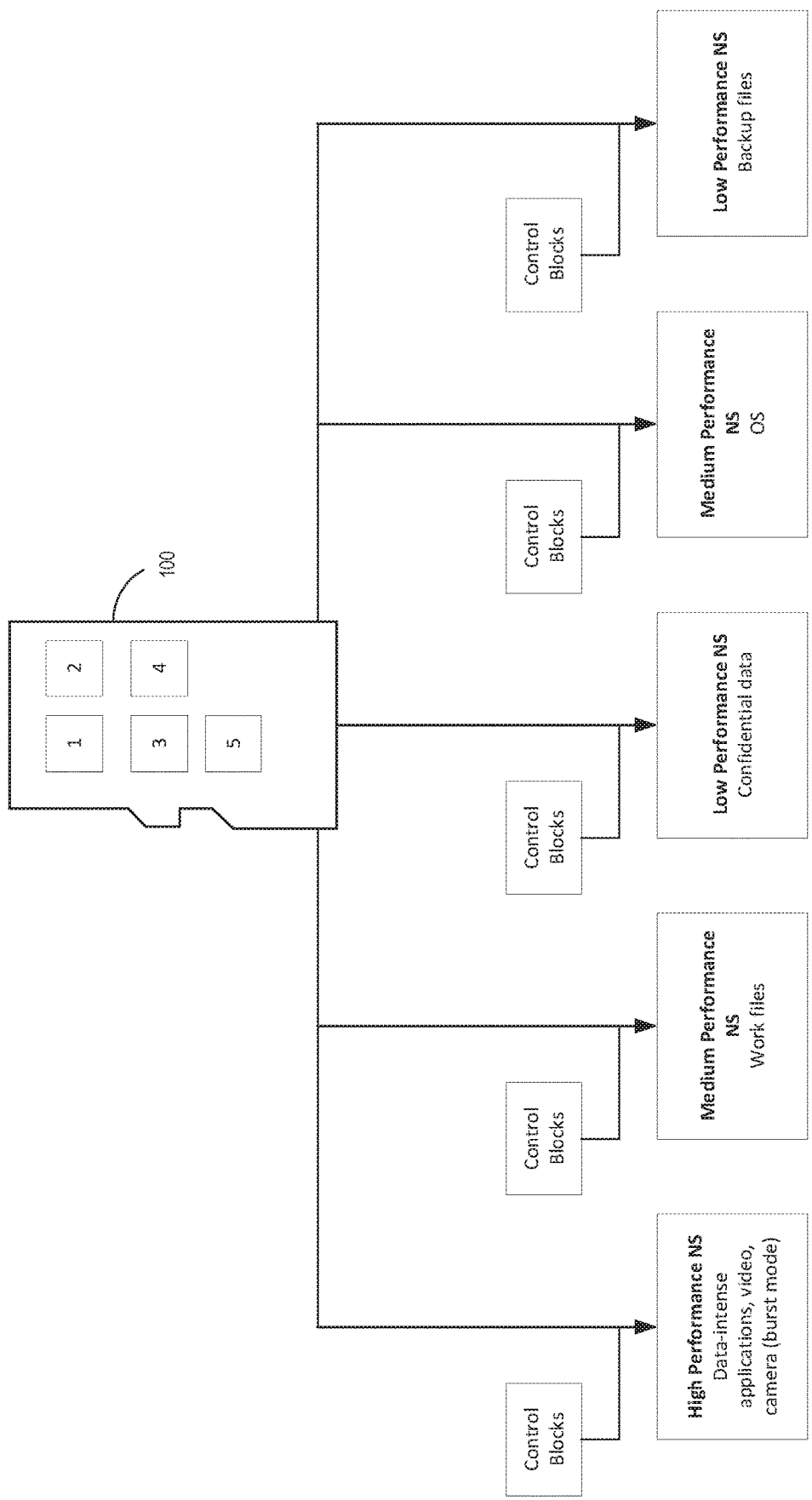
FIG. 6 is a block diagram of a plurality of partitions of a storage system of an embodiment.

An example of this implementation is illustrated in FIG. 6. As shown in FIG. 6, the storage system 100 has five namespaces, each with its own control block. In this example, the first namespace is a high-performance namespace used to store data-intensive applications, video, and burst-mode camera data. The second namespace is a medium-performance namespace used to store work files. The third namespace is a low-performance namespace used to store confidential data. The fourth namespace is a medium-performance namespace used to store the operation system (OS). The fifth namespace is a low-performance namespace used to store backup files.

There are several advantages associated with these embodiments. For example, multi-namespace storage devices with security at each namespace in non-computing storage devices (e.g., SD Express) can help the end user and original equipment manufacturer (OEM). Discrete control blocks for each partition can provide an array of benefits with respect to data integrity and assigning attributes to partitions. Also the likelihood of drive failure is reduced when compared to traditional single control block devices. Further, performance, security, and endurance can be addressed with a single card with multi-namespace technology. These embodiments also provide flexibility to format individual namespaces in a secured way without impacting other namespaces and data integrity.

Also, these embodiments allow removable drives with bootable namespaces (and discrete control blocks) where a user can plug in the drive and boot and thus get complete access to his environment, data, and tools, all secured with biometric security or two-level authentication (or any other security scheme). Further, in a multi-namespace non-computing storage device, each namespace can be configured for a different purpose, such as performance, reliability, endurance, and security. Additionally, removable drives with multiple namespaces and high performance provides advantages over embedded storage and decouples the storage and hardware coupling in case of mobile devices. Also, the storage system 100 of these embodiments, with its local cloud functionality, emphasizes content isolation and protection per user, has advantages in terms of data backup and security. This can provide a new class of scalable/configurable/secure storage system which is cost effective in its class and opens a new class of storage device ecosystem.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system, comprising:
   a memory configured to be partitioned into a plurality of independently-bootable partitions, wherein each partition comprises its own dedicated control block comprising (a) instructions for restricting access to the partition only to an authenticated entity, (b) its own boot block configured to boot the partition even if another one of the plurality of partitions is not bootable due to a problem with a boot block in the another one of the plurality of partitions, and (c) copies of boot blocks of other partitions of the plurality of partitions wherein a number of copies of boot blocks equals a number of the other partitions in the plurality of partitions; and
   a controller configured to communicate with the memory and to for each of the plurality of partitions:
      attempt to boot the partition using the boot block in the dedicated control block in the partition;
      in response to a failure to boot the partition, use a boot block in the dedicated control block of another one of the plurality of partitions to boot the partition; and
      in response to successfully booting the partition, attempt to authenticate an entity to access the partition;
   wherein different partitions of the plurality of partitions comprise their own dedicated control blocks.

2. The storage system of claim 1, wherein each partition's control block also stores authentication information for the partition and/or identification of performance, reliability, and/or endurance characteristics for that partition.

3. The storage system of claim 1, wherein the controller is further configured to synchronize boot blocks among the plurality of partitions.

4. The storage system of claim 1, wherein the plurality of partitions comprises a plurality of namespaces.

5. The storage system of claim 1, wherein an entity authenticates to at least one of the plurality of partitions using two-factor authentication, biometric authentication, a Quick Response (QR) code, or a password.

6. The storage system of claim 1, wherein the storage system is configured to be embedded in a host.

7. The storage system of claim 1, wherein the storage system is configured to be removably connected to a host.

8. The storage system of claim 1, wherein the storage system is configured to wirelessly communicate with a plurality of hosts.

9. The storage system of claim 1, wherein the memory is further configured to be partitioned into an additional partition that is shared by a plurality of entities.

10. The storage system of claim 1, wherein the memory comprises a three-dimensional memory.

11. The storage system of claim 1, wherein all of the boot blocks are used in attempting to boot the plurality of partitions.

12. The storage system of claim 1, wherein each partition's control block also stores a logical-to-physical address table for the partition.

13. The storage system of claim 1, wherein each partition's control block also stores identification of an encoding/decoding technique used in the partition.

14. A method comprising:
    performing the following in a storage system comprising a plurality of namespaces, each namespace associated with its own dedicated control block comprising (a) instructions for restricting access to the namespace only to an authenticated entity, (b) its own hoot block configured to boot the namespace even if another one of the plurality of namespaces is not bootable due to a problem with a hoot block in the another one of the plurality of namespaces and (c) copies of boot blocks of other namespaces of the plurality of namespaces, wherein a number of copies of boot blocks equals a number of the other namespaces in the plurality of namespaces:
       attempting to boot the plurality of namespaces with their associated control blocks;
       in response to a failure in booting a first namespace using the first namespace's control block, using a second namespace's control block to boot the first namespace; and
       in response to successfully booting the first namespace, attempting to authenticate an entity to access the first namespace;
    wherein different namespaces of the plurality of namespaces comprise their own dedicated control blocks.

15. The method of claim 14, further comprising synchronizing the control blocks.

16. The method of claim 14, further comprising using at least one of the following to authenticate the entity: two-factor authentication, biometric authentication, a Quick Response (QR) code, or a password.

17. The method of claim 14, wherein each control block stores at least one of the following: a logical-to-physical address table, identification of an encoding/decoding technique, authentication information, and/or identification of performance, reliability, and/or endurance characteristics.

18. The method of claim 14, wherein the storage system comprises a memory that comprises a third namespace that is shared by a plurality of entities.

19. The method of claim 14, wherein the storage system wirelessly communicates with a plurality of hosts.

20. A storage system, comprising:
    a memory configured to be partitioned into a plurality of independently-bootable partitions, wherein each partition comprises its own dedicated control block comprising (a) instructions for restricting access to the partition only to an authenticated entity, (b) its own boot block configured to boot the partition even if another one of the plurality of partitions is not bootable due to a problem with a boot block in the another one of the plurality of partitions and (c) copies of boot blocks of other partitions of the plurality of partitions, wherein a number of copies of boot blocks equals a number of the other partitions in the plurality of partitions;

means for attempting to boot a partition using a boot block in a dedicated control block in the partition;

means for using a boot block in a dedicated control block of another one of the plurality of partitions to boot the partition in response to a failure to boot the partition; and means for attempting to authenticate an entity to access the partition in response to successfully booting the partition;

wherein different partitions of the plurality of partitions comprise their own dedicated control blocks.

\* \* \* \* \*